A. C. Manning,
Sash Fastener.

No. 104,974.        Patented July 5, 1870.

Witnesses:
Asa W. Davis
James E. Hill

Inventor:
Alfred C. Manning

UNITED STATES PATENT OFFICE.

ALFRED C. MANNING, OF NORWICH, CONNECTICUT.

IMPROVEMENT IN SASH-HOLDERS.

Specification forming part of Letters Patent No. 104,974, dated July 5, 1870.

*To all whom it may concern:*

Be it known that I, ALFRED C. MANNING, of Norwich, New London county, State of Connecticut, have invented certain Improvements in Sash-Holders, of which the following is a specification.

My improvement relates to that kind of sash-holder which is placed in the frame opposite the meeting-rails, and has two bolts, one for securing each sash, both bolts being simultaneously moved by turning a single shaft; and the said invention consists in a peculiarly-formed casing, cast in three pieces, and in a novel arrangement of the bolts upon the operating-shaft.

Figure 1:
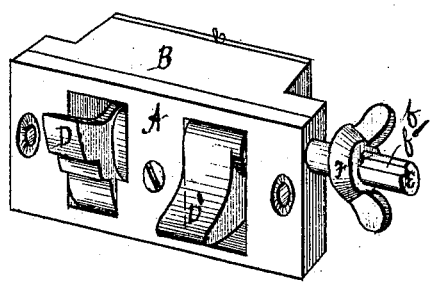
Figure 2:
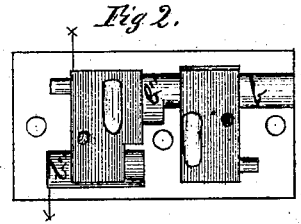
Figure 3:
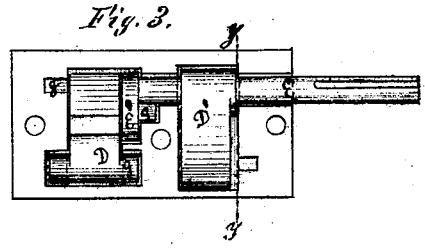
Figure 4:
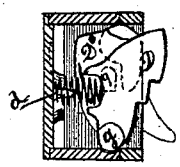
Figure 5:

Figure 1 represents a plan view, Figs. 2 and 3 longitudinal sections, and Figs. 4 and 5 cross-sections.

A represents the face-plate, with rectangular openings, through which the bolts play, and also semicircular depressions to fit over the journals of the bolts, and angular lugs to register with corresponding depressions in the body of the case.

B is the body of the case, cast in a single piece, with hollows for the journals of the bolts and shaft $b$ $b'$ $b'$ and recesses for the lugs of the face-plate $c$ $c'$.

C is the bottom or back plate of the case or lock, and is cast with small conical projections $d$ $d'$ to retain the coiled springs $e$ $e'$, which throw forward the bolts D D'.

E is the shaft, cast with a lug, for keying on the bolt D' and operating it, and with an arm, E', at right angles to and for operating D.

F is a thumb-piece for rotating the shaft, and slides freely upon it, being prevented from turning by the tongue and groove $f f'$.

$g$ is the journal of the bolts D.

$q$ is a lug on D, against which E' strikes.

The coiled springs for throwing the bolts rest upon projections in the base-plate and in recesses cast in the bolt.

In placing the parts together the bolt D is keyed upon the shaft and the bolt D' dropped into its journal-box. The operating-shaft and bolt D are then inserted, and the base-plate, with the coiled springs in position, placed beneath these. Upon placing over these parts the face-plate A, a single screw secures all the parts together in working order. The case or lock is then inserted in the window-frame at the meeting-rails and a turn of the thumb-piece unfastens both sashes, which are furnished with notched plates adapted to the bolts into which the bolts pass.

The thumb-piece is removable, so that the sashes cannot be opened except by the conductor, if the fastener is used upon car-windows.

I am aware that sash-holders of this general character and placed in the position at the meeting-rails, are old, and I therefore do not claim the same; but I believe that the simple and inexpensive way in which I construct mine is novel.

I claim—

1. The face-plate A, with its bolt-openings, in combination with the plate B, when the two plates have the grooves $b$ $b$ on their contiguous faces as bearings for the shaft D and trunnions $g$, substantially as described.

2. In combination with the above, the back-plate C, when the three parts are secured together by a single screw, as described.

3. In combination with the plates A and B, constructed as described in the first claim, the shaft E, operating simultaneously the bolts D and D', as described.

ALFRED C. MANNING.

Witnesses:
ASA W. DAVIS,
JAMES E. HILL.